United States Patent Office

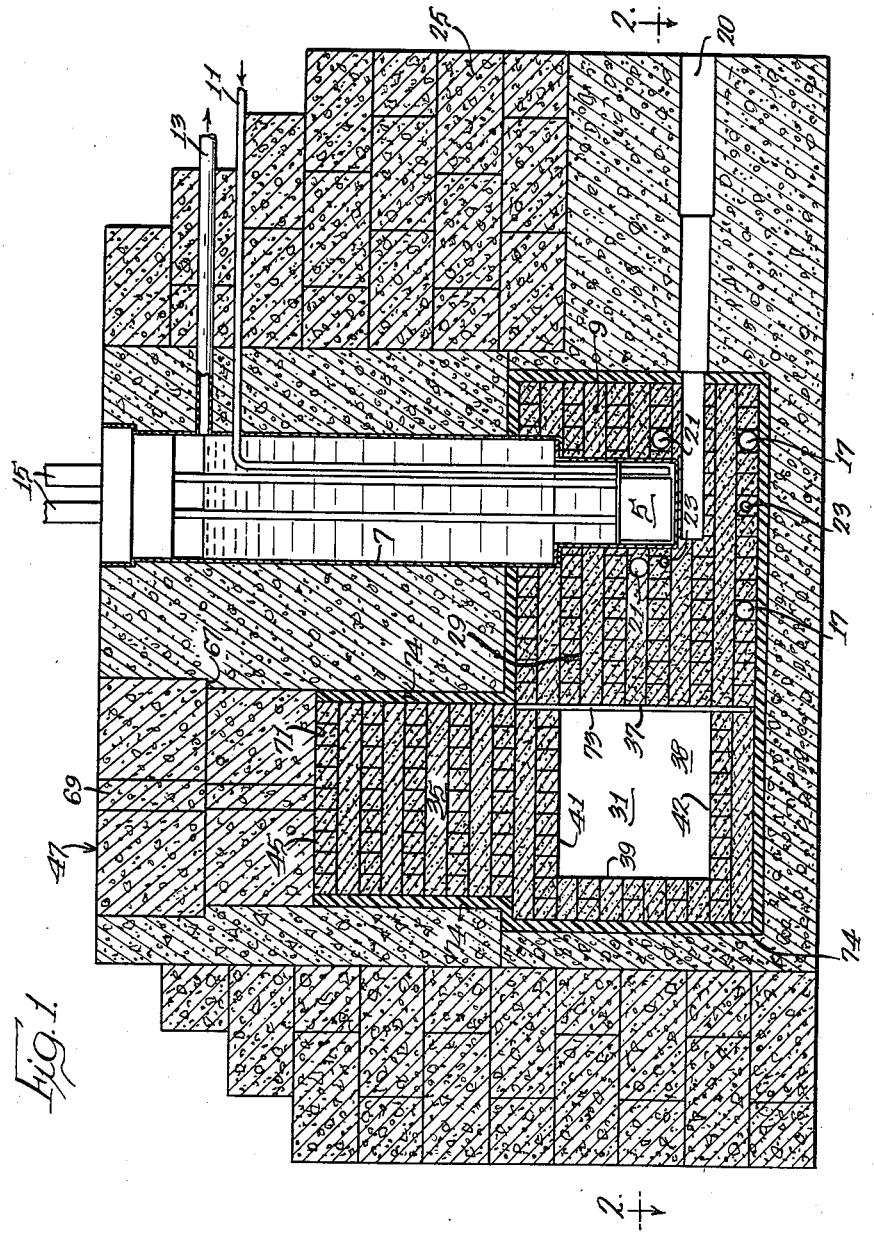

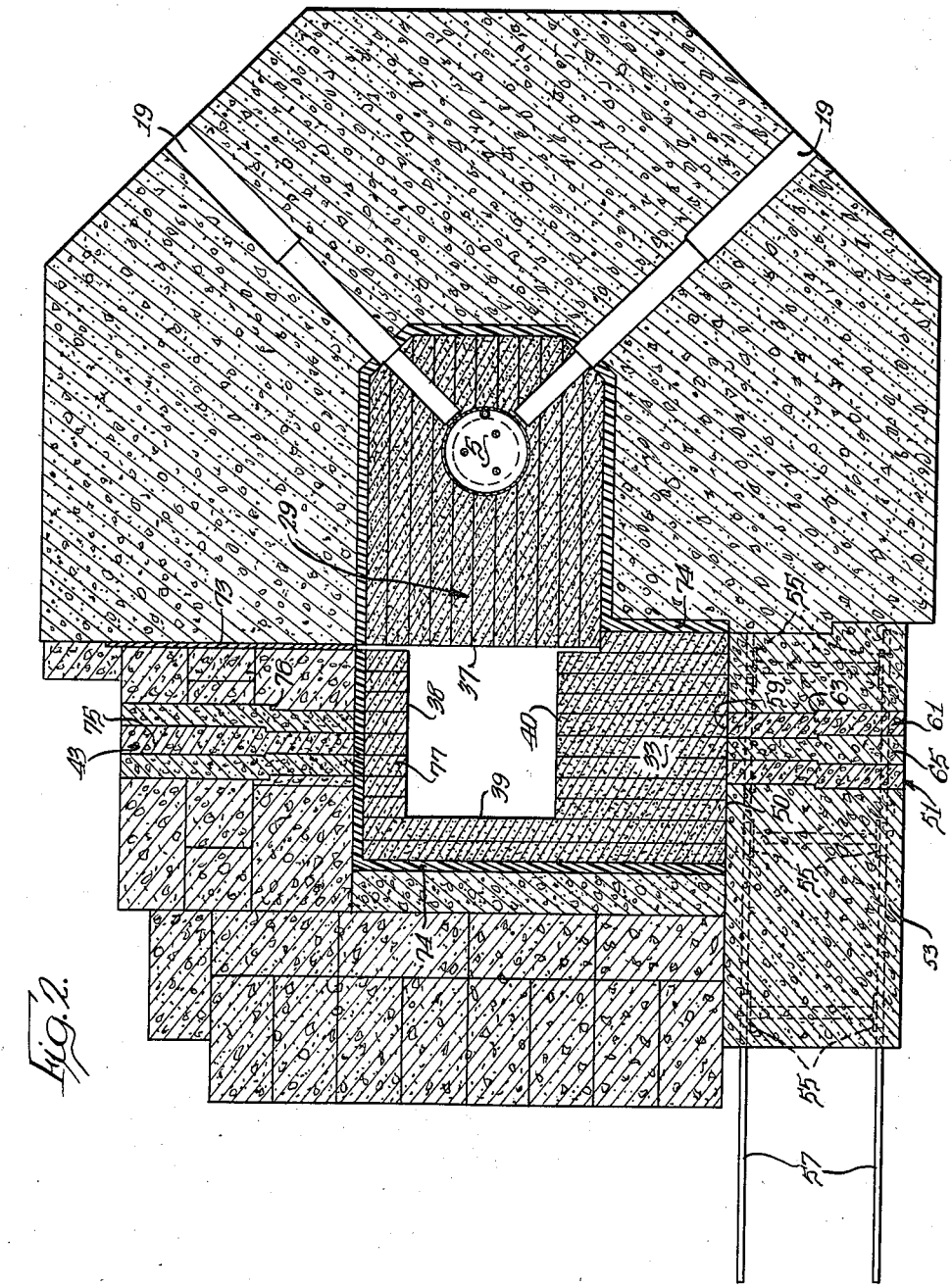

2,940,916
THERMAL COLUMN FOR A REACTOR
Harvey Prescott Sleeper, Jr., Solana Beach, Calif., assignor to General Dynamics Corporation, New York, N.Y., a corporation of Delaware Filed Oct. 2, 1957, Ser. No. 687,716

6 Claims. (Cl. 204—193.2)

The present invention relates generally to neutronic reactors and more particularly to a thermal column associated with a neutronic reactor.

As is generally now well known, a neutronic reactor includes a reactive core containing a moderator and a fuel-containing fissionable material, a reflector surrounding the core to conserve escaping neutrons, a protective shield enclosing the reflector and core, and suitable measuring and control mechanisms. In a neutronic reactor designed for use in the research field provision is also usually made for various facilities, such as a thermal column, through holes, irradiation ports, etc., which are adapted for use in conducting various types of experimental work.

A thermal column in a reactor is essentially a facility for thermalizing neutrons produced in the reactor, i.e., for reducing the velocity of the neutrons so that they have approximately the same kinetic energy as the atoms or molecules of the medium in which they are undergoing elastic scattering, and for permitting a flow of thermal neutrons from the reactor.

A substance which has a high scattering cross-section and a low neutron absorption or capture cross-section may be used to slow down neutrons by means of a series of essentially elastic collisions and therefore may be utilized as the building material for a thermal column. Such neutron slowing materials are generally referred to as moderators. While other substances may be used, graphite is commonly used as a moderator in a neutronic reactor.

The provision of a vertical thermal column in a reactor is very desirable as certain experiments may be more advantageously conducted with a vertically directed flow of neutrons than with a horizontal flow of neutrons. Ordinarily, it would be desirable to place such a vertical column directly over the reactor core; however, in most reactor designs this position considerably complicates the control problem. The next most convenient location is adjacent to the core above a conventional horizontally extending graphite thermal column. In a design of this type, the horizontal column pipes the neutrons from the reactive core to the base of the vertical column. This construction, however, presents the difficulty of having a highly asymmetric neutron density distribution across the base of the vertical column. This density distribution decreases approximately exponentially from the edge of the vertical column closest to the reactive core. With a column of graphite of specific gravity 1.7 which is four or five feet wide, the variation in neutron density across the base of the vertical column in a direction outwardly from the reactor core will be in excess of 10.

Due to the large variation in source intensity across the base of the vertical column and due to leakage of neutrons through the sides of the column, considerable length would be required in a vertical thermal column to obtain an equilibrium flow distribution pattern, or normal mode spacial distribution, of the neutron flux across the top of the column. Unfortunately, length in a thermal column is accompanied by a serious loss of useful neutron flux due both to side leakage of neutrons from the column and neutron capture in the column.

A solution to the above indicated dilemma of either suffering a series loss of useful neutrons or having a highly asymmetric neutron density distribution at the top of a vertical thermal column overlying a horizontal thermal column which extends from the reactive core is achieved by the novel introduction of a suitable void or neutron cavity at the juncture of the horizontally extending thermal column and the vertical thermal column. By providing sufficient thickness in the walls surrounding the neutron cavity a relatively isotropic source of neutrons will be provided within the cavity due to multiple reflections from the walls of the cavity. A short vertical column may then be used. This same principle may be employed in the construction of other thermal columns extending from other faces of the neutron cavity and transversely of the horizontal thermal column which extends from the reactive core.

Accordingly, the principal object of the invention is the provision of a new and improved thermal column for a neutronic reactor. A further object is to provide a relatively short thermal column which extends in a generally transverse direction from a thermal column extending from the reactive core of the neutronic reactor and which has a high intensity flux of thermal neutrons as well as a symmetric equilibrium density distribution pattern across its outer face.

Other objects and advantages of the invention will become known by reference to the following description and the accompanying drawings of one embodiment of the invention.

In the drawings:

Figure 1 is an elevational view in section of a typical reactor including thermal columns constructed in accordance with the invention; and Figure 2 is a sectional view taken along line 2—2 of Figure 1.

In the drawings there is illustrated a neutronic reactor which incorporates several thermal columns including a primary thermal column extending from the reflector in a generally radial direction with respect to the center of the reactive core and having a cavity therein, and secondary thermal columns extending from the cavity in a direction transverse to the primary thermal column.

While a thermal column formed in accordance with the present invention may generally be utilized in connection with any type of reactor, for illustrative purposes, the present invention is shown in connection with a reactor of the general type disclosed in Taylor et al. application, Serial No. 664,706, filed on June 10, 1957 (now abandoned). Located generally in the center of the reactor is the reactive core 5. The core is surrounded by a reflector 9 of suitable moderating material such as graphite. Water coolant is pumped into the bottom of the core 5 by means of a conduit 11 and flows upwardly through the core 5 into an overlying, vertically extending tank 7, leaving by means of a conduit 13. Extending down through the center of the tank and entering into the core are various conventional control and safety rods 15. Extending generally horizontally into the reactor into an area in close proximity to the reactive core are various holes for control and neutron irradiation purposes, including monitoring holes 17, radial beam holes 19, an irradiation hole 20, through holes 21 and rabbit holes 23. The entire structure is enclosed in a suitable concrete shield 25.

Extending outwardly beyond the reflector 9 on one side of the reactive core but within the concrete shielding is a primary thermal column generally indicated at 29 having a neutron cavity 31 therein. A horizontal secondary and a vertical secondary thermal neutron column 33 and 35 respectively extend outwardly from the cavity 31 in directions transverse to the primary thermal column 29. In the disclosed embodiment the various columns may be conveniently constructed of graphite moderating material in brick form.

The primary thermal column 29 is integral with the reflector 9 at its inner end or end closest to the reactive core. The cavity 31 located within the horizontal primary thermal column 29 is of cubical shape, having side walls 37, 38, 39 and 40, a top wall 41, and a bottom wall 42. The cavity 31 is situated adjacent the outer end of the primary column a sufficient distance from the reactive core to cause most of the neutrons being piped from the reactive core to be reduced to thermal energies by the time they reach the cavity 31. The interior of the cavity 31 is accessible through a horizontally extending concrete access plug assembly 43.

The walls of the cavity 31 are of a sufficient thickness of graphite moderating blocks to produce a high thermal neutron albedo, i.e., the ratio of the neutrons reflected or returning to the cavity to the neutrons leaving the cavity. A graphite wall of 8 inches in thickness produces a thermal neutron albedo of 0.83 and is adequate for the purposes of the present invention. Because of the high albedo the neutrons distribute themselves fairly uniformly over the six faces of the cavity, the cavity thus approaches an isotropic source of neutrons. The presence of a generally isotropic source of neutrons within the cubical cavity provides five independent walls 38 through 42, available from which secondary thermal columns may be extended and independently employed. Additionally, when there is provision for access directly into the cavity, as in this preferred embodiment, the cavity may also be employed for irradiation of rather large objects in a high flux area.

Extending vertically from the interior face of the top wall 41 of the cavity in a direction transverse to the primary thermal column 29 is the vertical secondary thermal neutron column 35 having an outlet end 45. Since the neutron cavity is not a perfect isotropic source, the column 35 is preferably of sufficient length to produce an equilibrium flow distribution pattern of the neutron flux across its outer end or face 45. Extending through the concrete shield to the outer face 45 of the column is a removable concrete access plug assembly 47.

The horizontal secondary thermal column 33 extends in a direction transverse to the primary thermal column 29 from the interior face of the side wall 40 of the cavity 31 and also is preferably of sufficient length to produce an equilibrium flow distribution pattern of the neutron flux across its outer face 50. Access to the central portion of the face 50 of the secondary thermal column 33 is provided by a removable concrete access plug assembly 51. In addition, a portion 53 of the exterior concrete shielding in the area around the outlet end 50 of the horizontal secondary thermal column 33, including the removable access plug 51, is mounted on a set of wheels 55, running on a track 57. This portion 53 may be wheeled on the track 57 to expose the entire column face 50.

The secondary horizontal thermal column access plug assembly 51 is generally rectangular in cross section with an inner end 59 which abuts against a portion of the outer face 50 of the secondary thermal column 33. The plug 51 is formed with an intermediate circumferential step 63 or shoulder to prevent the direct flow of radiation outwardly of the reactor along the outer surface of the plug. The inner end 59 of the plug is therefore of smaller dimensions than its outer end 61 which is flush with the exterior of the shielding. The plug assembly 51 also includes a smaller central section 65 of similar stepped construction.

When employing one of the secondary thermal columns for experimental purposes, the access plug is removed to allow a flow of neutrons from the secondary thermal column to contact the specimen or object exposed. It is desirable, therefore, to have the plug-within-a-plug arrangement in order to restrict the neutron flow passage to an area only as large as necessary.

The vertical secondary thermal column access plug 47 is similarly constructed, having a circumferential step 67 and an inner plug 69. The inner end portion 71 of the access plug 47 is slightly larger in horizontal section than the outer face 45 of the vertical secondary thermal column 35 so the entire end of the vertical thermal column may be exposed.

The cavity access plug assembly 43 is of similar construction to the horizontal thermal column access plug 51, having an intermediate circumferential step 78 and an inner plug 75. However, it includes an inner end portion 77 of moderator material which extends to the neutron cavity 31.

As can easily be seen, in the embodiment disclosed, both secondary thermal columns 33 and 35 extend from interior faces of the cavity in a direction transverse to the primary thermal column 29. This has a very beneficial purpose in that only a small percentage of the gamma rays emitted from the reactive core and travelling through the primary column are transversely scattered and escape through the secondary thermal columns 33 and 35.

When the thermal columns 33 and 35 are not in use the number of neutrons entering into the cavity may be greatly reduced by use of a movable curtain 73 of material having a high neutron capture cross section such as boral, a complex of aluminum and boron carbide. The curtain 73 may be slidably movable by suitable means such as a track (not shown) from a position within the concrete shield to the position shown in Figure 2 across the primary thermal column 29 adjacent the interior face of the cavity wall 37.

To improve the neutron density distribution at the outer faces 45 and 50 of the secondary thermal columns 35 and 33 respectively, their side walls are each surrounded by about a 2 inch layer of a hydrogenous material such as polyethylene, indicated at 74. In terms of neutron diffusion 2 inches of polyethylene is equivalent to about 8 inches of graphite. As a consequence of the use of the polyethylene layer 74, the neutron flux in the circumferential portions of the thermal columns 45 and 50 are increased. A thin layer of polyethylene may also be used advantageously around the side walls of the primary thermal column as well as around portions of the reflector 9.

The efficiency of the cavity 31 in serving as a secondary isotropic source of thermal neutrons depends upon the reflecting power or albedo of the cavity walls. The albedo of the cavity walls is increased from about 0.83 for 8 inches of graphite, to about 0.90 by adding 2 inches of polyethylene around the graphite which surrounds the cavity.

The secondary thermal columns 33 and 35 each provide a higher intensity thermal neutron flux in a more uniform equilibrim flow distribution pattern across its outer face than would be possible without the neutron cavity 31 and/or the polyethylene layer 74.

It will be apparent to one skilled in the art that various changes and modifications may be made in the disclosed construction without departing from the scope of the invention which is to be determined from the appended claims.

I claim:

1. In a neutronic reactor having a central reactive core, a reflector surrounding the core, a shield enclosing the reflector and core, and control means extending through the shield and reflector into the core for regulating the reaction of the core, an improved thermal column comprising a primary thermal column formed of a neutron moderating material extending outwardly from the reflector surrounding the reactive core and in a generally radial direction with respect to the center of the core, said primary thermal column having a neutron cavity therein which is spaced from the reactive core a distance sufficient to thermalize most of the neutrons flowing to said cavity from the reactive core through said primary column, and a secondary thermal column formed of a neutron moderating material extending from said neutron cavity in a direction generally transverse to the direction of said primary thermal column.

2. In a neutronic reactor having a central reactive core, a reflector surrounding the core, a shield enclosing the reflector and core, and control means extending through the shield and reflector into the core for regulating the reaction of the core, an improved thermal column comprising a primary thermal column formed of graphite extending outwardly from the reflector surrounding the reactive core and in a generally radial direction with respect to the center of the core, said primary thermal column having a neutron cavity therein which is spaced from the reactive core a distance sufficient to thermalize most of the neutrons flowing to said cavity from the reactive core through said primary thermal column, a secondary thermal column formed of graphite extending from said neutron cavity in a direction generally transverse to the direction of said primary thermal column, and the side walls of said secondary thermal column being surrounded by a layer of a hydrogenous moderator to increase the neutron flux adjacent said walls and provide a more uniform neutron density distribution along the outer face of said secondary thermal column.

3. In a neutronic reactor having a central reactive core, a reflector surrounding the core, a shield enclosing the reflector and core, and control means extending through the shield and reflector into the core for regulating the reaction of the core, an improved thermal column comprising a primary thermal column formed of a neutron moderating material extending outwardly from the reflector surrounding the reactive core and in a generally radial direction with respect to the center of the core, said primary thermal column having a neutron cavity therein which is spaced from the reactive core a distance sufficient to thermalize most of the neutrons flowing to said cavity from the reactive core through said primary thermal column, a curtain of neutron absorbing material extending transversely of said primary column within the reactor, said curtain being movable from a position outside said primary thermal column to a position transversely across said primary thermal column between the neutron cavity and the reactive core, and a secondary thermal column formed of a neutron moderating material extending from said neutron cavity in a direction generally transverse to the direction of said primary thermal column.

4. In a neutronic reactor having a central reactive core, a reflector surrounding the core, a shield enclosing the reflector and core, and controls means extending through the shield and reflector into the core for regulating the reaction of the core, an improved thermal column comprising a generally square primary thermal column formed of a neutron moderating material extending outwardly from the reflector surrounding the reactive core and in a generally radial direction with respect to the center of the core, said primary thermal column having a cubical neutron cavity therein which is spaced from the reactive core a distance sufficient to thermalize most of the neutrons flowing to said cavity from the reactive core through said primary thermal column, means providing access from the exterior of the reactor to the interior of said cubical neutron cavity, and a secondary, generally square thermal column formed of a neutron moderating material extending from said cavity in a direction generally transverse to the direction of said primary thermal column.

5. In a neutronic reactor having a central reactive core, a reflector surrounding the core, a shield enclosing the reflector and core, and control means extending through the shield and reflector into the core for regulating the reaction of the core, an improved thermal column comprising a horizontally extending, generally square primary thermal column formed of graphite extending outwardly from the reflector surrounding the reactive core and in a generally radial direction with respect to the center of the core, said primary thermal column having a cubical neutron cavity therein which is spaced from the reactive core a distance sufficient to thermalize most of the neutrons flowing to said cavity from the reactive core through said primary thermal column, a vertically extending, generally square secondary thermal column formed of graphite extending from the top face of said cavity, and a horizontally extending, generally square secondary thermal column formed of graphite extending from a side face of said cavity in a direction generally transverse to the direction of said primary thermal column, and the side walls of the secondary thermal columns being surrounded by a layer of polyethylene to increase the neutron flux adjacent said side walls and to provide a more uniform neutron density distribution along the outer faces of said secondary thermal columns.

6. In a neutronic reactor having a central reactive core, a reflector surrounding the core, a shield enclosing the reflector and core, and control means extending through the shield and reflector into the core for regulating the reaction of the core, an improved thermal column comprising a horizontally extending, generally square primary thermal column formed of graphite extending outwardly from the reflector surrounding the reactive core and in a generally radial direction with respect to the center of the core, said primary thermal column having a cubical neutron cavity therein which is spaced from the reactive core a distance sufficient to thermalize most of the neutrons flowing to said cavity from the reactive core through said primary thermal column, a curtain of neutron absorbing material extending transversely within the reactor, said curtain being movable from a position outside said primary thermal column to a position transversely across said primary column between said neutron cavity and the reactive core, means providing access from the exterior of the reactor to the interior of said cubical neutron cavity, a vertically extending, generally square secondary thermal column formed of graphite extending from the top face of said cavity, and a horizontally extending, generally square secondary thermal column formed of graphite extending from a side face of said cavity in a direction generally transverse to the direction of said primary thermal column, and the side walls of the secondary thermal columns being surrounded by a layer of polyethylene to increase the neutron flux adjacent said side walls and to provide a more uniform neutron density distribution along the outer faces of said secondary thermal columns.

References Cited in the file of this patent

UNITED STATES PATENTS 2,807,580     Fenning et al. _____ Sept. 24, 1957

OTHER REFERENCES

Hughes: "Pile Neutron Research," 1953, Addison-Wesley Publishing Company, Inc., Cambridge 42, Mass., pp. 230–235.